United States Patent [19]

Roe et al.

[11] 3,860,793

[45] Jan. 14, 1975

[54] APPARATUS FOR REPRODUCING PROGRAMMED SELECTIONS OF DATA RECORDED IN CODED FORM ON MAGNETIC CARDS

[75] Inventors: Malcolm David Roe; John Henry Donald; Peter Lee Chappell; Malcolm Kirk; John David Edwards; Stanley Keith Greenham, all of Croydon, England

[73] Assignee: Dataplex Limited, Croydon, Surrey, England

[22] Filed: Aug. 28, 1972

[21] Appl. No.: 284,171

[30] Foreign Application Priority Data

Sept. 1, 1971 Great Britain .................... 40854/71

[52] U.S. Cl. 235/61.9 R, 235/61.11 D, 235/61.7 B, 235/61.12 M, 235/61.6 J, 346/74 M

[51] Int. Cl..... G06k 1/12, G01d 15/06, G06k 3/00, G06k 7/08, G06k 19/06

[58] Field of Search... 235/61.12 N, 61.6 R, 61.6 H, 235/61.12 M, 61.7 R, 61.9 R, 61.7 B, 61.11 R, 61.11 A; 340/172.5, 152; 197/20; 346/74 M

[56] References Cited

UNITED STATES PATENTS

| | | | |
|---|---|---|---|
| 2,905,299 | 9/1959 | Hildebrandt | 197/20 |
| 3,025,941 | 3/1962 | Blodgett | 197/20 |
| 3,035,764 | 5/1962 | Beman | 235/61.9 R |
| 3,114,150 | 12/1963 | Calano | 346/74 |
| 3,191,006 | 6/1965 | Avakian | 235/61.7 R |
| 3,198,427 | 8/1965 | Locke | 197/20 |
| 3,375,500 | 3/1968 | Fowler | 340/172.5 |
| 3,513,298 | 5/1970 | Riddle | 235/61.11 D |
| 3,555,246 | 1/1971 | Lemelson | 235/61.11 R |
| 3,559,175 | 1/1971 | Pomeroy | 340/152 |
| 3,578,953 | 5/1971 | Milford | 235/61.11 E |
| 3,585,369 | 6/1971 | Nather | 235/61.11 R |
| 3,632,995 | 1/1972 | Wilson | 235/61.12 N |
| 3,651,310 | 3/1972 | Link | 235/61.7 B |
| 3,684,869 | 8/1972 | Reiter | 235/61.12 M |
| 3,740,530 | 6/1973 | Hoffer | 235/61.7 B |

*Primary Examiner*—Daryl W. Cook
*Assistant Examiner*—Robert M. Kilgore
*Attorney, Agent, or Firm*—Browdy & Neimark

[57] ABSTRACT

Apparatus is provided for reproducing programmed selections of blocks of data recorded in coded form in a plurality of separate tracks on a magnetic card, the selection being made in accordance with a program of instructions recorded in separate blocks on the same or a further magnetic card. The apparatus includes a magnetic card reader for reading from a card the series of instruction characters forming a program, a program store for temporarily storing the program thus reproduced, decoding means for decoding each instruction character taken from the program store, and a magnetic card reader for reading selections of data from a card in accordance with the decoded instructions. The reproduced data may be printed out or otherwise displayed, or transmitted to other apparatus.

16 Claims, 11 Drawing Figures

Figure 1:
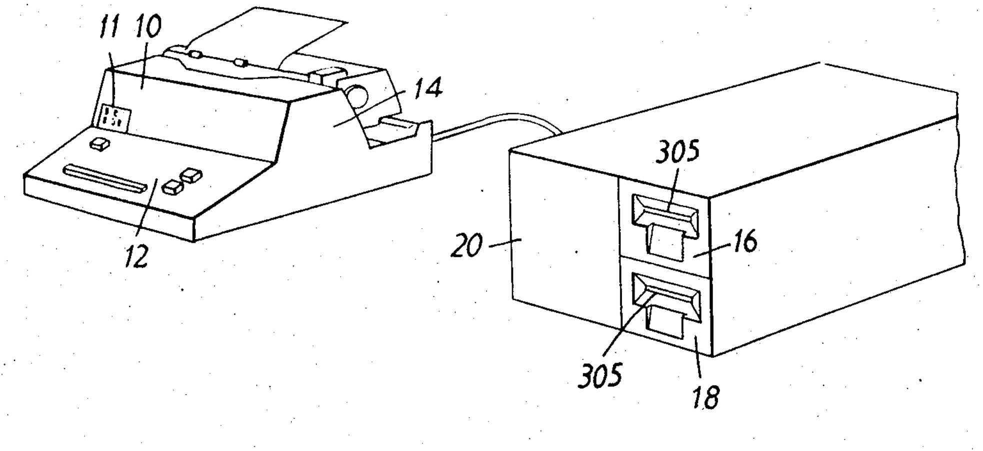

APPARATUS FOR REPRODUCING PROGRAMMED SELECTIONS OF DATA RECORDED IN CODED FORM ON MAGNETIC CARDS

This invention relates to apparatus for reproducing programmed selections of data recorded on magnetic cards.

According to this invention there is provided apparatus for reproducing programmed selections of blocks of data recorded in coded form in a plurality of separate tracks each occupying one of a plurality of predetermined positions on a magnetic card, the selection of blocks of data being made in accordance with a program of instructions recorded as a series of characters on the same or a further magnetic card, comprising program reproducing means including a magnetic card reader adapted to reproduce from the appropriate magnetic card the series of characters representing the program, a program store adapted to store the series of characters reproduced by the magnetic card reader, decoding means for decoding each instruction character taken from the program store, and data reproducing mean including a magnetic card reader adapted in response to the decoded instructions to reproduce data recorded in those tracks of the appropriate magnetic card which contain the selected blocks of data.

Preferably, the program reproducing means is operable in response to a manual input to the apparatus to reproduce a series of instruction characters recorded in coded form in a selected block or blocks on the appropriate magnetic card. Advantageously, the program reproducing means is operable in response to the decoding of an instruction character taken from a series of instruction characters in the program store to reproduce a further series of instruction characters recorded in coded form in a selected block or blocks on the appropriate magnetic card.

The data reproducing means may include output means through which the coded data thus reproduced can be supplied to transmitting apparatus for transmission to other equipment in a different location. Instead of, or in addition to, the output means, the data reproducing means may include decoding means for decoding the reproduced data, and printing or display means operable to print or display the decoded data.

Preferably there are provided input means through which data in the form of a series of characters can be supplied to the apparatus, encoding means for encoding each character of the data thus supplied, and recording means for recording the coded characters in preselected positions on a magnetic card. The recording means may be combined with the magnetic card reader in a magnetic card read/write mechanism.

The input means may comprise a manually operated keyboard having a plurality of keys and electrical circuit means associated with each key, depression of the key causing the circuit means to supply an electrical signal to the encoding means. The keyboard and the printing means may be arranged together in the form of an electric typewriter. The input means may also comprise means for receiving coded data transmitted from other equipment.

The invention also includes apparatus for recording data in coded form in a track or tracks occupying a selected one or ones of a plurality of predetermined positions on a magnetic card, in accordance with a program of instructions recorded as a series of characters in coded form on the same or a further magnetic card, comprising program reproducing means including a magnetic card reader adapted to reproduce from the appropriate magnetic card the series of characters representing the program, a program store adapted to store the series of characters reproduced by the card reader, decoding means for decoding each instruction character taken from the program store, data input means for supplying to the apparatus a series of characters representing data, and recording means operable in response to the decoded instructions to record the data in the selected track or tracks on the appropriate magnetic card.

Figure 4:
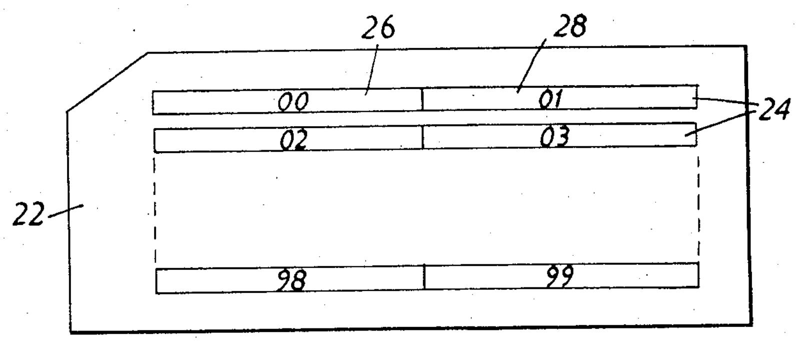
Figure 2A:
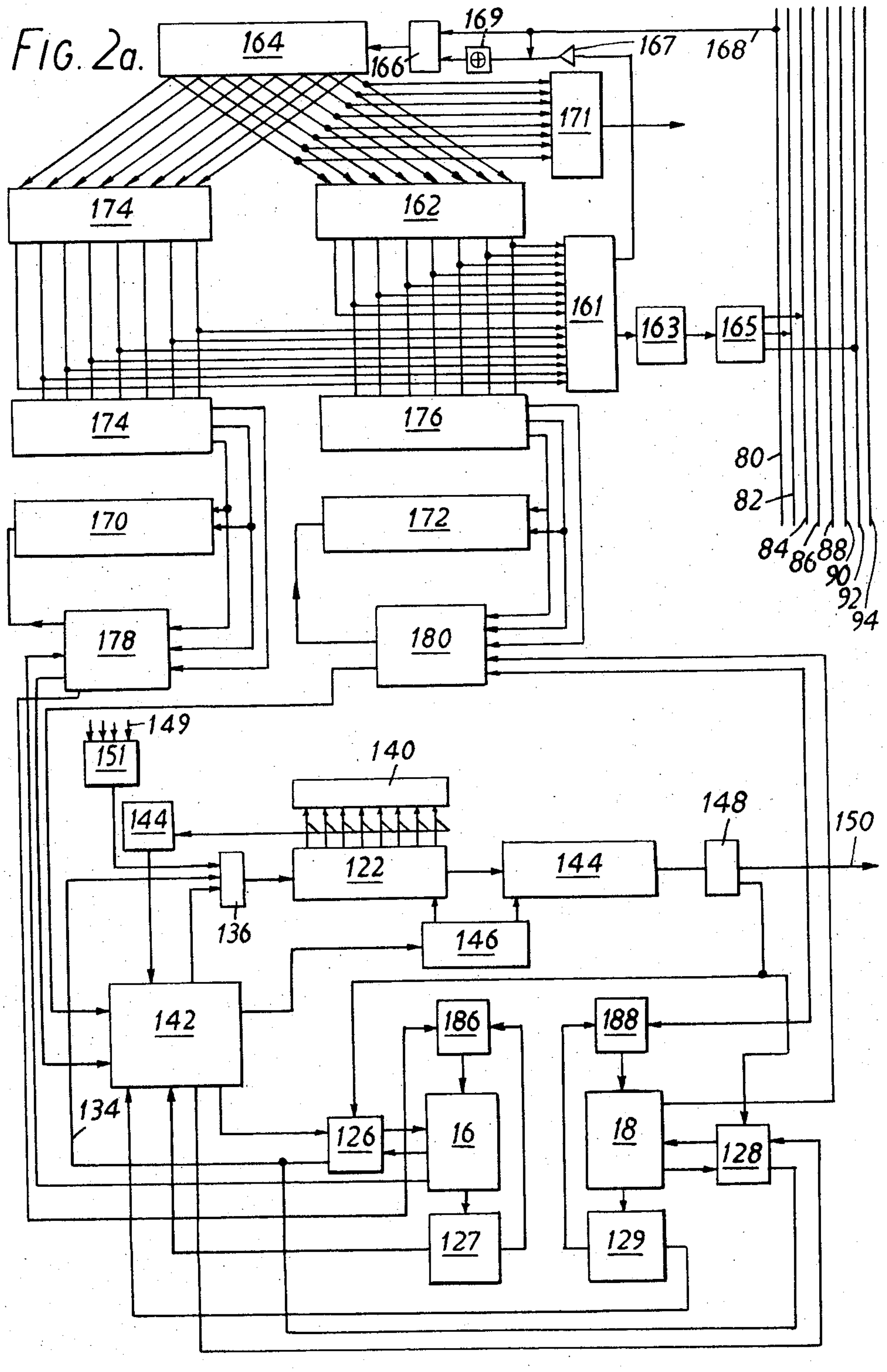
Figure 2B:
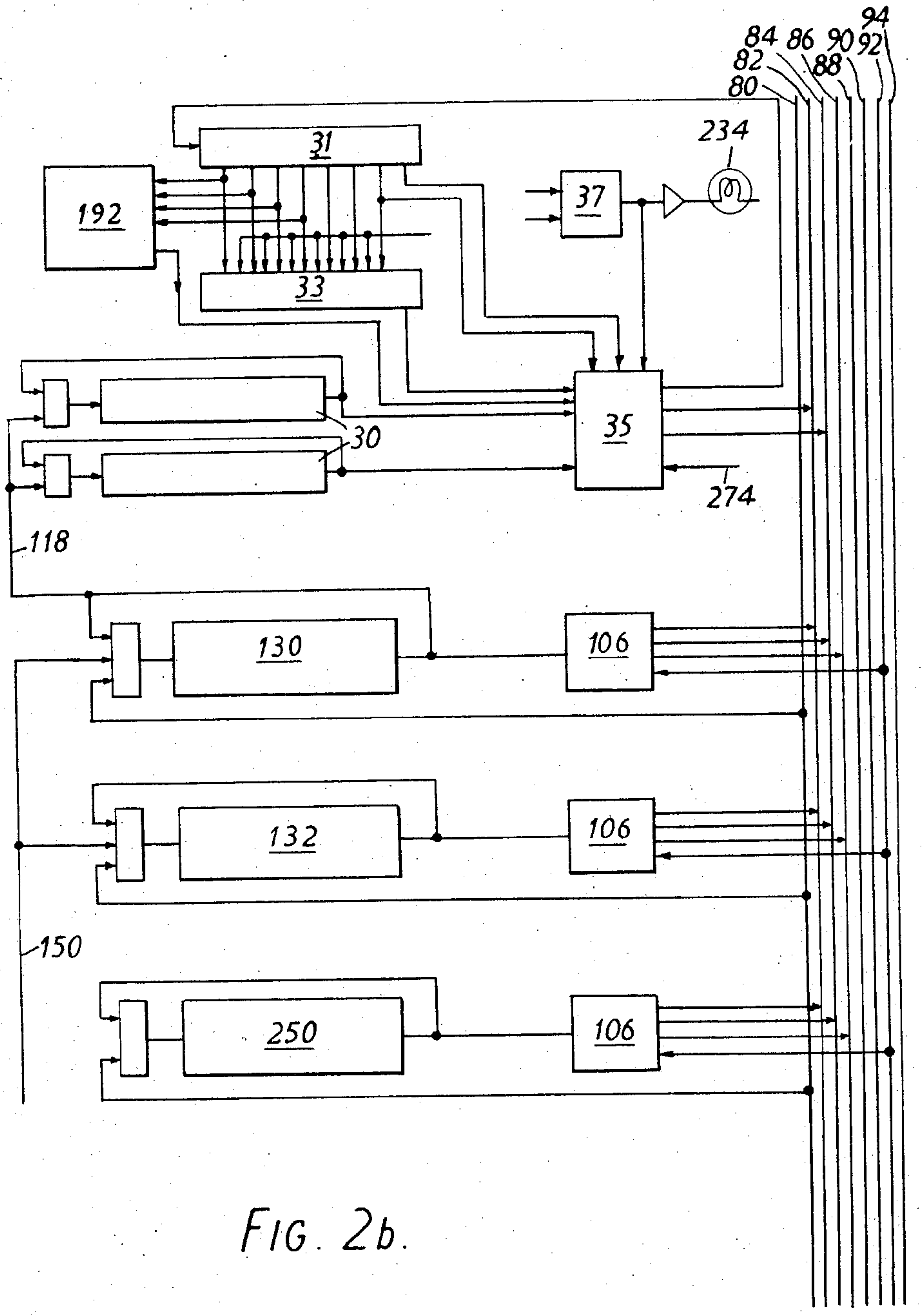
Figure 2C:
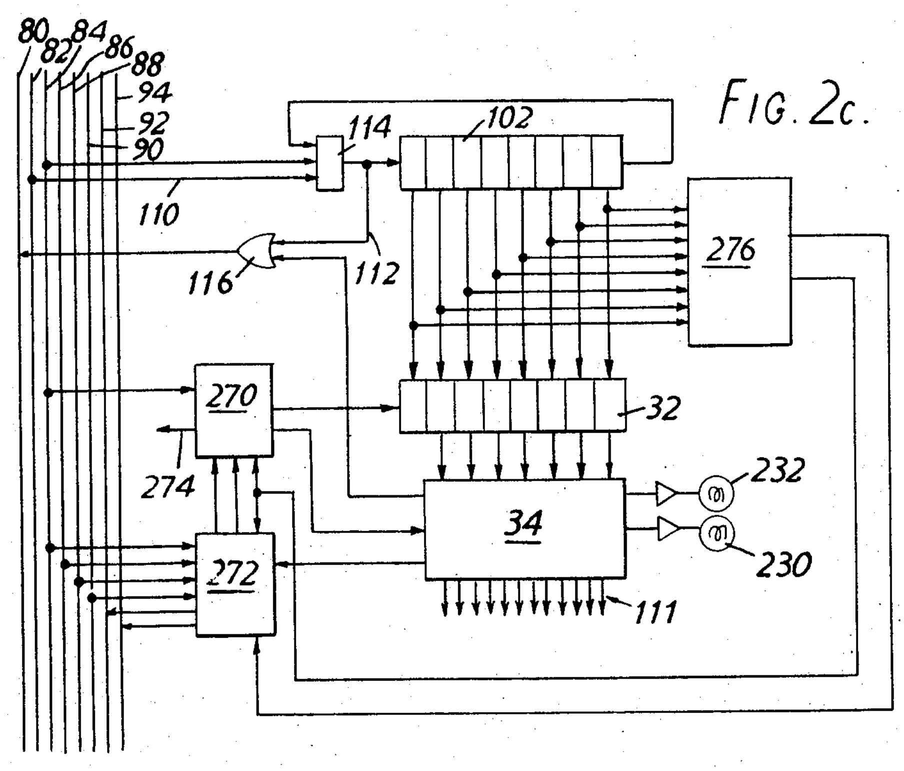
Figure 2E:
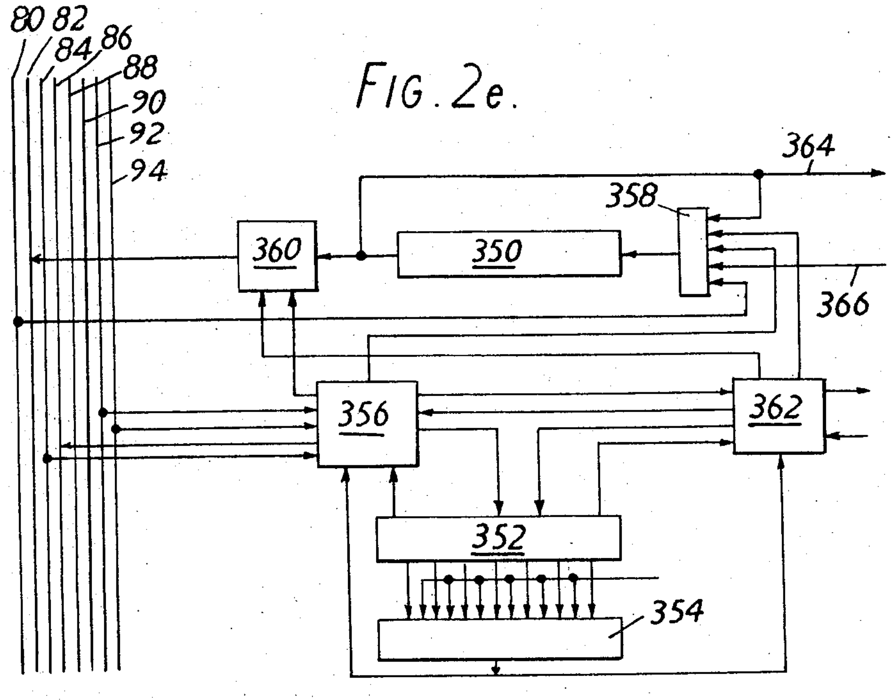
Figure 2D:
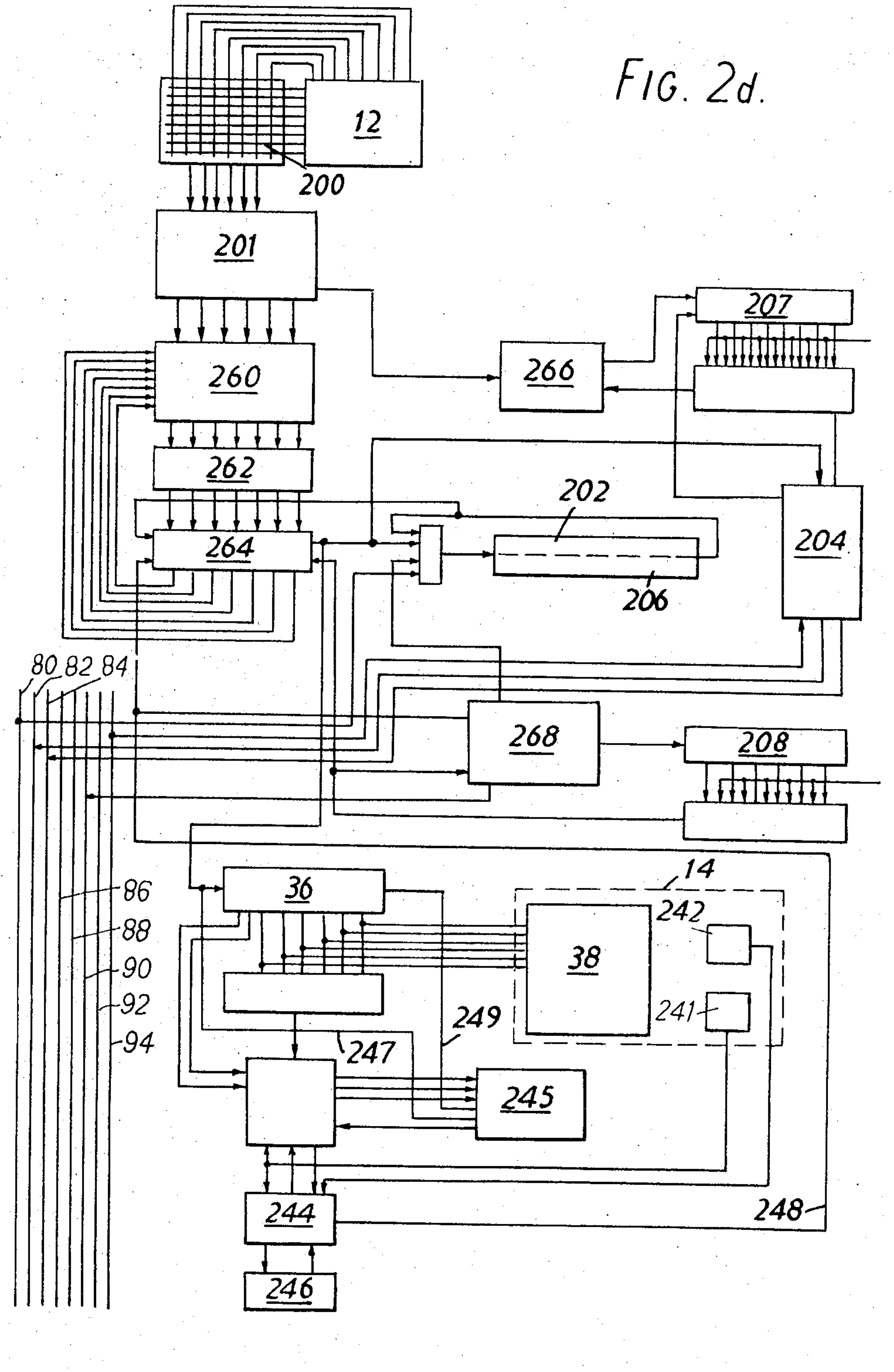
Figure 3:
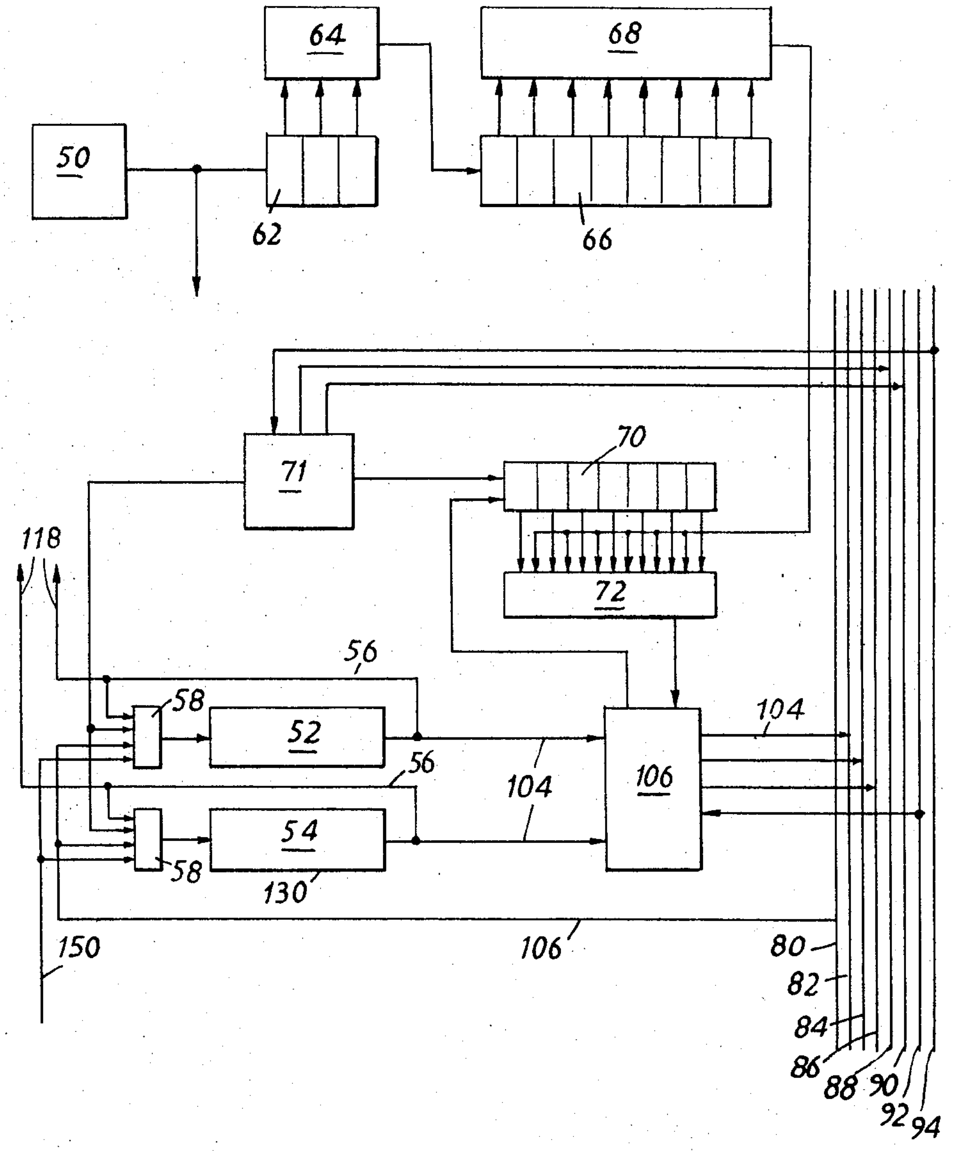
Figure 5:
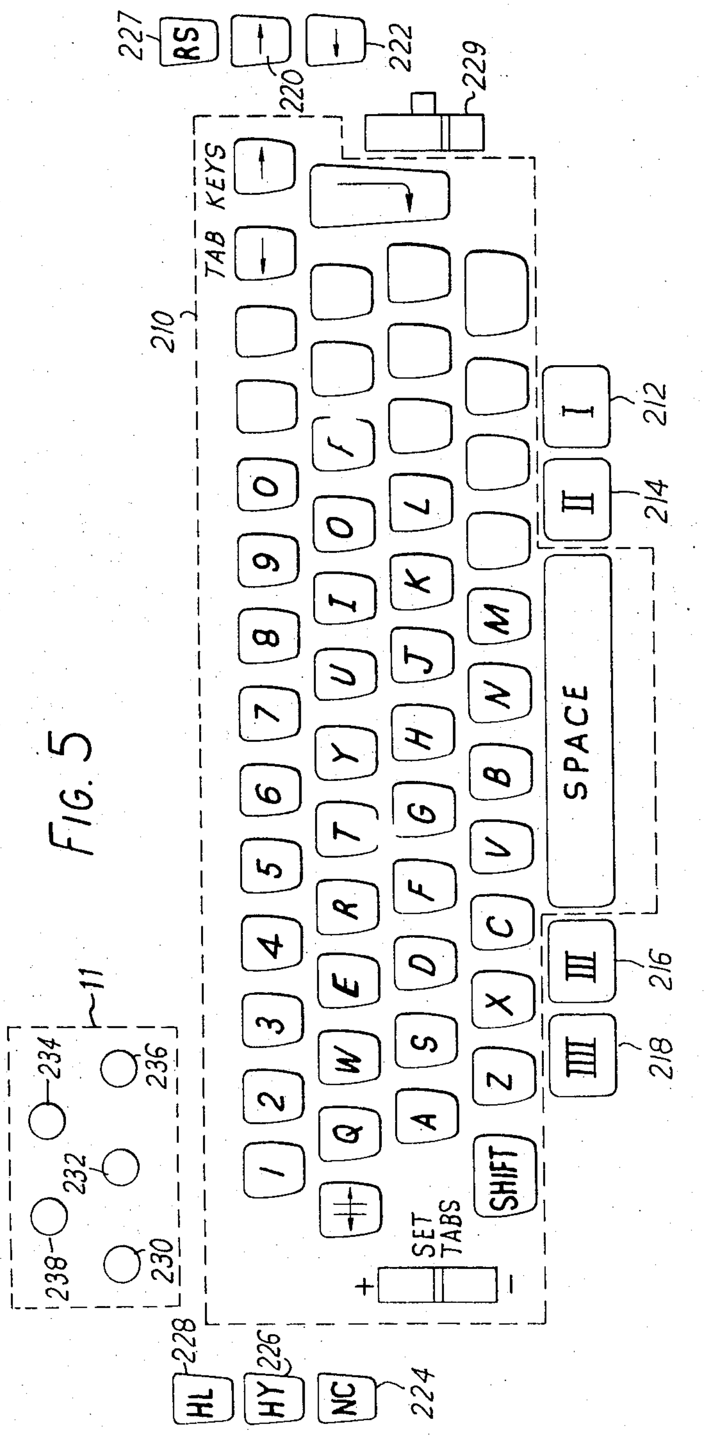
Figure 6:
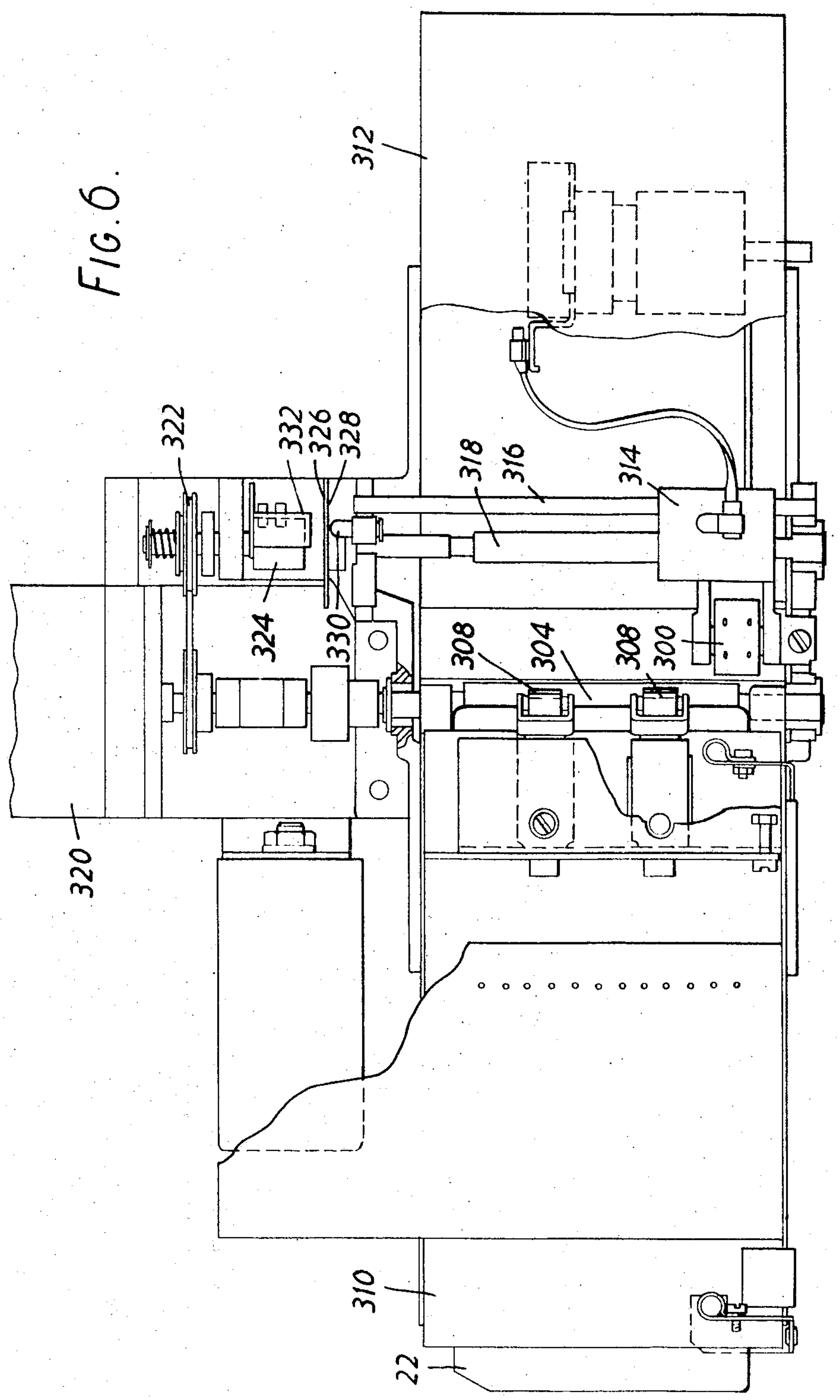
Figure 7:
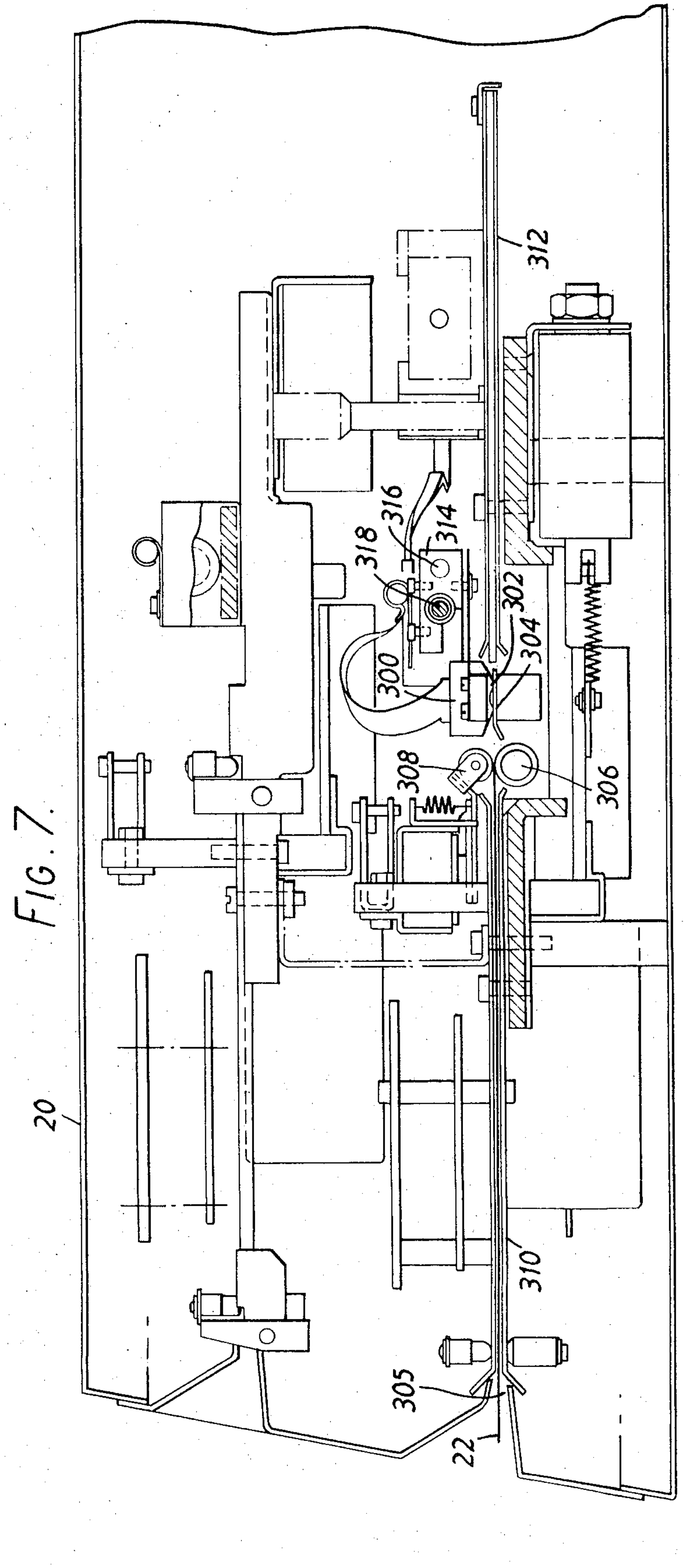

One embodiment of the invention will now be described, by way of example, with reference to the accompanying drawings, in which:

FIG. 1 is a perspective view of apparatus according to the invention,

FIGS. 2*a* to 2*e* together form a logic block diagram of the apparatus of FIG. 1, FIG. 3 shows part of the block diagram of FIG. 2 together with a master clock of the apparatus, FIG. 4 shows diagrammatically a magnetic card employed by the apparatus of FIG. 1, FIG. 5 is a diagram showing the layout of a keyboard of the apparatus, FIG. 6 is a plan view of a magnetic card read/write mechanism of the apparatus, and FIG. 7 is a side elevation of the mechanism of FIG. 5.

Referring to FIG. 1, the apparatus takes the form of an automatic typewriter, comprising an electrically operated typewriter 10 which can be considered as consisting of a manually operated keyboard 12 and a printer 14 which can print out characters in response to electrical signals supplied from the electronic circuits of the apparatus or from the keyboard, first and second magnetic card read/write mechanisms 16 and 18 housed in a casing 20 and each adapted to reproduce signals recorded in digital form on magnetic cards and to record signals in digital form on the cards, and electronic circuitry housed mostly in casing 20 for controlling the interactions between the typewriter and the card read/write mechanisms.

The apparatus is adapted to operate with magnetic cards on which data and program instructions can be recorded in digital coded form. Each magnetic card 22 (see FIG. 4) comprises a thin rectangular card of plastics material, of dimensions 7⅜ by 3¼ by 0.008 inches, bearing on one face a coating of magnetic material. Characters representing data or program instructions are recorded in digital coded form in 50 adjacent parallel tracks 24 each extending lengthwise of the card. The characters are recorded in continuous form along each track 24 by saturation recording, each recorded bit being represented by reversals in the polarity of the magnetic flux produced in the coating of magnetic material. Each track can accommodate a total of 256 characters each consisting of eight binary digits. Seven of the binary digits are used to represent the character in a suitable code (e.g., an international standard code) whilst the eighth binary digit is a parity bit. Each of the tracks 24 contains two separate blocks of data, each of 128 characters. As shown in FIG. 3, the 100 blocks thus formed are sequentially numbered "00" to "99" so that each block has a separate address which can be entered at the typewriter keyboard as a two-figure number. For example, the blocks of the first track on the card, indicated by reference numerals 26 and 28 in FIG. 3, have addresses 00 and 01 respectively.

FIGS. 6 and 7 show details of the magnetic card read/write mechanisms 16 and 18, FIG. 7 being partly in section to show the internal construction of read/-write mechanism 18, the other read/write mechanism being identical in construction. As shown in the Figures, each mechanism includes a read/write head 300, containing separate "read" and "write" cores having respective "read" and "write" gaps 302 and 304 spaced apart in the direction of the tracks of a card 22 inserted into the mechanism through mouth 305. A drive mechanism, consisting of a continuously rotating drive roller 306, driven by electric motor 320, and solenoid-actuated pinch rollers 308, is provided for reciprocating a card 22 past the read/write head 300, the card moving in guides 310 and 312. The head 300 is mounted on a head block 314 slidable on a horizontal guide rod 316 perpendicular to the direction of movement of card 22. The head is movable by means of a head transport mechanism comprising a lead screw 318 engaging in a threaded bore in the head block 314 and rotatable by motor 320 through a slipping clutch mechanism 322. The pitch of the lead screw 318 is such that rotation through 360° of the screw effects transverse movement of the head through a distance equal to the distance between recorded tracks on a magnetic card 22. A solenoid-operated cam and dog mechanism 324 can be actuated to release the lead screw 318 to allow it to rotate so that the read/write head 300 is moved by the screw, the cam and dog mechanism when released holding the head stationary in a position corresponding to one of the tracks 24 in a magnetic card 22. Associated with the lead screw 318 is a position sensor 326 comprising an opaque disc 328, fixed to the lead screw having a cut out sector, and a light source 330 and photosensitive device 332 on opposite sides of the disc 328. The disc 328 is positioned so as to prevent light falling onto the device 332 except when the lead screw is in one of the positions in which it can be held stationary by the cam and dog mechanism 324. Thus, as the lead screw 318 rotates, the sensor provides an output signal at each complete revolution of the screw, the signal being supplied to control circuits including a head position counter 170 or 172, as described below.

Each magnetic card read/write mechanism includes a number of sensors operable to sense the position of a magnetic card 22 in the mechanism and to provide appropriate signals to the control circuitry of the apparatus.

The magnetic card read/write mechanisms are described more fully in copending British application No. 45834/71.

FIGS. *2a* to *2e* together form a logic block diagram of the apparatus, the parts of the diagram shown in each of the Figures being connected together by the common lines 80, 82, 84, 86, 88, 90, 92 and 94, the purposes of which are described below.

Referring to FIGS. *2a* to *2e* the electronic circuitry of the apparatus includes control circuits for controlling the operations of the magnetic card read/write mechanisms 16 and 18 and the typewriter printer 14, a program store 30 (FIG. *2b*) adapted to store a series of coded characters representing a program reproduced from a magnetic card, an instruction register 32 (FIG. *2c*) which can receive one character at a time from the program store and which is connected to an instruction decoder 34 which decodes the character in the instruction register 32 and supplies electrical control signals through lines 111 to other parts of the circuitry to cause the operation represented by the instruction to be carried out, for example, to cause one of the read/-write mechanisms to reproduce coded signals recorded on a card in the mechanism, a printer register 36 (FIG. *2d*) which can receive one at a time, coded characters which have been reproduced from a magnetic card by one of the read/write mechanisms 16 and 18 or supplied from the keyboard 12 and which is connected to a printer decoder 38 which decodes the character in the printer register and supplies electrical signals to the control circuits of thetypewriter printer to cause the printer to print out the character or carry out the mechanical operation represented by the coded character.

Since the rate at which the typewriter printer 14 can print out characters and carry out its mechanical operations such as carriage return, the rate at which the manually operated keyboard 12 can supply coded characters to the electronic circuitry and the rate at which each of the magnetic card read/write mechanisms 16 and 18 can reproduce characters recorded in coded form on a magnetic card 14 and record coded characters on a magnetic card all differ widely from one another and vary according to the particular operation which is being performed at any moment, buffer stores are provided for each of these components of the apparatus, as described in more detail below, to provide temporary storage for coded characters emitted from or to be supplied to the component.

Each of the buffer stores and the program store comprises one or two dynamic shift registers each formed as a metal-oxide-silicon integrated circuit. FIG. 3 shows for example, the buffer store 130 associated with the first magnetic card read/write mechanism 16, the buffer store consisting of two shift registers 52 and 54. Each shift register is connected in a continuously recirculating configuration, with the output of the shift register being fed back to its own input through a line 56 and logic gates 58. The shift registers are operated in synchronism under the control of clock pulses supplied by a master clock 50 of the apparatus (see FIG. 3), each bit in each shift register being shifted through one space in each clock period. Each of the dynamic shift registers has a capacity 1,024 bits, so that it can accommodate 128 characters of eight-bit length, the characters thus recirculating once in every 1,024 clock periods. Associated with the master clock 50 is a first counter 62 which provides through decoder 64 a series of control signals at intervals of eight clock periods to a second counter 66 which provides through decoder 66 a repeating sequence of 128 of these control signals, so that the time of occurrence of each control signal represents the time at which a particular character space, or a coded character occupying that space, will appear at the output of each shift register during the recirculation cycle. The two shift registers 52 and 54 are provided with a common address pointer counter 70 of seven bits length which can be set to specify the time at which a particular character space into which a character is to be inserted or from which a character is to be extracted will appear at the output of either shift register. Associated with the pointer 70 is a comparator 72 which receives the control signals from the clock counter 66 and compares the specified time in the address pointer 70 with the actual clock time. When the two are equal, i.e., when the desired character space appears at the output of one of the shift registers, the coded character in the space is extracted through the access logic circuitry 106 or, if a coded character is to be inserted, the recirculation loop of the shift register is broken and the character is inserted at the input through gates 58, the character appearing at the output being lost. Thus a coded character can be inserted or extracted at any point in the series of characters stored in the shift register. Movement of characters into and from the buffer is controlled by electronic circuitry 71 which is connected to the control lines 88, 90 and 94 and also, to other minor control lines (not shown).

The track buffer store 132 associated with the second read/write mechanism 18, the program store 30, working buffer store 250 (FIG. 2*b*), and the printer/keyboard buffer store 202 (FIG. 2*d*) similarly consist of dynamic shift registers provided with address pointers and comparators to enable coded characters to be inserted or extracted through suitable logic gates at any point in the series of characters stored in the shift registers. They are therefore not shown in detail in FIGS. 2*b* and 2*d*.

The transfer of coded characters between the buffer stores takes place principally through a data highway, comprising an input line 80 and an output line 82, and an eight-bit transfer shift register 102. Each of the buffer stores has an output line connected through suitable logic gates to the output line of the data highway and an input line connected through logic gates to the input highway. For example, as shown in FIG. 3, each of the shift registers 52 and 54 comprising track buffer store 130 has its output connected through lines 104 and logic circuit 106 to the output line 82, and its input connected through line 108 and gates 58 to the input line 80. The transfer register 102 has its input connected through line 110 and logic gate 114 to the output line 82 of the data highway and its output connected through gate 114, line 112 and gate 116 to the input line 80 of the data highway. Thus a single coded character or a series of coded characters can be transferred from one buffer store to another, each coded character being transmitted along the output line 82 of the data highway to the transfer register 102 through which it is transmitted to the input line 80 of the data highway and supplied to the buffer store or buffer stores whose logic gates are in a condition to allow the coded character to enter the buffer store or stores from the input line of the data highway. Various control lines and status lines are connected between the buffers and associated logic gates to ensure that only one character is being transmitted along the data highway at any time and to ensure that before a character is emitted into the highway the or each of the buffer stores which is to receive the character has an empty space into which the character can be inserted. The principal control and status lines are the control line 84 ("GOING") through which gate 114 is controlled to allow a character supplied to the output line 82 to enter the transfer register 102, the control lines 92 and 94 ("OUTPUT GO" and "INPUT GO") through which is controlled the sequence of operations involved in transferring characters from the buffer stores or transfer register to the data highway and vice versa. The principal status lines are line 86 ("EMPTY") a signal on which indicates that a buffer store from which characters are being transferred is now empty, so that the output operation can be terminated, line 88 ("FULL") a signal on which indicates that a buffer store to which characters are being transferred is full, and line 90 a signal on which indicates that buffer stores in a condition to receive characters from the highway are in fact receiving them. In certain cases special lines are provided for transferring characters between buffers, for example lines 118 from the track buffer store 130 associated with the first card read/write mechanism to the program store 30 as described below, since in these cases it is simpler to provide a special line than to provide the logic circuitry necessary to enable the data highway to be used.

The transfer register 102 is connected directly to the instruction register 32, through lines 120, so that a character extracted from the program store 30 and inserted into the transfer register 102 is supplied directly to the instruction register 32, where it is decoded as described above.

The two read/write mechanisms 16 and 18 have associated therewith respective first and second track buffer stores 130 and 132, each comprising two 128-character registers, as shown in FIG. 3, so that each is able to store the series of characters reproduced from a single track of a magnetic card inserted into the associated read/write mechanism. Coded characters reproduced by either read/write mechanism are transferred to the associated track buffer store via two serially connected eight-bit shift registers 122 and 124 (see FIG. 2*a*) which are common to the two read/write mechanisms 16 and 18, only one of the mechanisms being in operation at any one time. Thus, whilst a magnetic card is moving past a read/write head in one of the mechanisms as described above, under the control of control circuits 127 or 129 (FIG. 2*a*), each character reproduced by the electrical circuits 126 or 128 (FIG. 2*a*) of the read/write head is supplied one bit at a time to the first eight-bit register 122 through line 134 and logic gate 136, under the control of control circuits 142. Whilst each character is in this register, a parity check on the character is carried out by a suitable decoder 140 connected to the register 122. If the parity is correct, a "start" signal supplied to control circuits 142 by decoder 144 causes shift control 146 to transfer the character to the second eight-bit register 124, so that the first register can receive the next character from the read/write head circuits. If the parity is incorrect, a signal from the parity check decoder 140 causes the apparatus to begin again the process of reproducing the characters in the relevant track of the magnetic card, and causes an error indicating lamp 200 (see FIG. 5) on the typewriter to light. From the second eight-bit register 124 each character is transferred through logic gate 148 and line 150 to the relevant track buffer store 130 or 132. When coded characters are being recorded on a magnetic card, each character to be recorded is transferred from the relevant track buffer store 130 and 132 through one of the special lines 149 and logic gates 151 to the first eight-bit register 122, where a parity check is carried out by decoder 140, and is transferred from there to the second eight-bit register 124. The character is then supplied one bit at a time through line 152 to the read/write circuits 126 or 128 the appropriate read/write mechanism 16 or 18 which records each digit on the magnetic card. When the last digit of each character has been supplied to the read/write mechanism the next charactr is transferred from the first to the second eight-bit register. Since the rate of transfer of characters between the registers 122 and 124 is higher than the rate at which digits are recorded on a magnetic card, this transfer of characters does not interrupt the continuity of the recording on the card, the first digit of each character being recorded immediately after the last digit of the previous character.

In order to enable access to be afforded to the series of coded characters recorded in any desired block on a magnetic card 22 inserted into either of the magnetic card read/write mechanisms 16 or 18, a block address register (160 and 162 respectively — see FIG. 2*a*) is provided for each mechanism. Each address register 160 or 162 comprises a pair of four-bit binary coded decimal counters, so that the register can receive from input line 80 of the data highway through logic gate 166 and line 168 a coded address representing the position of any of the 100 blocks recorded on a magnetic card. Each of the block address registers can receive a coded address from a general address register 164, similarly comprising a pair of four-bit counters, the block address register 160 or 162 to which the coded address is to be transferred being activated to receive the address by a signal from the logic circuitry in response to a decoded instruction in the instruction register 32. Associated with the read/write head transport mechanism 186 and 188 respectively of each read/write mechanism 16 and 18 is a two-character head position counter 170 and 172, comprising a pair of four-bit binary coded decimal counters, which senses the position of the read/write head. To this end, during the operation of recording or reproducing characters on a magnetic card, the read/write head is moved initially to the position corresponding to the first track of the card 22 (containing blocks addressed 01 and 02). The head is then moved, under the control of control circuits 178 or 180, transversely across the card, and the head position counter 170 or 172 counts the units of movement of the head corresponding to movement from one track to an adjacent track on the card in response to an impulse supplied through line 182 from the sensor 326 associated with the head movement mechanism. The contents of the counter 170 or 172 and those of the associated address register 186 or 188 are compared by a respective comparator 174 or 176, and when this comparison shows that the head is positioned over the track containing the address block, the head movement is stopped and the head held in position whilst the card is moved to cause the appropriate track to be read. After one track has been read, the head remains in position and the contents of the head position counter 170 or 172 remain the same, so that when a further address is transferred to the associated address register 160 or 162, the comparator 174 or 176 causes the head to be moved in the appropriate direction to reach the newly addressed track, there being no need to return the head again to the position corresponding to the first track. The address stored in each address register 160 or 162 can be incremented or decremented, i.e., increased or decreased by one, in response to appropriate decoded program instructions, to enable successive blocks of data to be reproduced from a magnetic card under the control of a single program, as described below. The contents of either address register 160 or 162 can be transferred to the data highway through multiplexer 161, which serialises, i.e., converts into serial form, coded characters in the address register, an output of the multiplexer being connected through code converter 163, which converts the character into the standard code used by the machine, and access logic circuit 165 to the output line 82 of the data highway.

Certain instructions decoded by the instruction register decoder 34 require an operation to be executed if the address in one of the address registers 160 and 162 is equal to a specified address. For example, a program for reading in turn a number of blocks from a magnetic card, the contents of the relevant address register being incremented after each block has been read from the card, might include an instruction to stop the operation and put the machine into its idle state, when the address in the address register reaches a particular value. To this end, a second output of multiplexer 161 is connected to the input of general address register 164 through inverter 167 and "EXCLUSIVE-OR" gate 169, which also receives an input from line 168. In operation, the contents of the address register 160 or 162 and the specified address, transferred from the instruction register decoder onto the input line 80 of the data highway, are supplied bit by bit to the EXCLUSIVE-OR gate. If the two addresses are identical, the output of the EXCLUSIVE-OR gate will by a "1" digit for each binary digit of the addresses, so that the general address register 164 will be filled with 1's. If this occurs, a control signal is supplied by detector 171 to the execution sequence control logic circuit 272 to effect execution of the appropriate operation. After detection by detector 171, the 1's in register 164 are deleted.

The output of the track buffer store 130 associated with the first magnetic card read/write mechanism 16 can be supplied through the special line 118 to the program store 30 which comprises two 128-character recirculating shift registers to give a capacity to the buffer store of 256 characters. The program store is provided with an address pointer 31, comparator 33 and access logic circuitry 35. A series of coded characters representing a program can thus be read from a selected track of a magnetic card by the first magnetic card read/write mechanism 16 and transferred via the first track buffer store 130 to the program store 30, in which the program characters are stored in continuously recirculating form and from which any selected character can be extracted and supplied via the transfer register 102 to the instruction register 104.

The transfer of program instruction characters from program store 30 and subsequent execution of the decoded instructions is controlled by "fetch and execute" circuit 270 (FIG. 2*c*), the sequence of operations being controlled by logic circuitry 272. A special control line 274 from the circuit 270 to the access logic circuitry 35 of the program store 30 allows a control signal to be supplied directly to the access logic circuitry 35 to initiate the transfer of an instruction character from the program store. A decoder 276 connected directly to the transfer register 102 provides control signals to the execution sequence control logic circuitry 272 to determine the end of the time periods allowed for execution of certain instructions.

The electronic logic circuitry includes a 16 character read-only store 192 in which is stored a loading program adapted to control the loading into the program store 30 of a program read from a magnetic card. Starting of the loading program is effected manually by means of a special key II on the typewriter keyboard, as described below. A sequence of operations being carried out under control of a program in program store 30 can be stopped by a decoded program instruction supplied to bistable circuit 37, the apparatus being then placed in its idle state, in which it is under the control of the permanent loading program and can be used by the operator as an ordinary electric typewriter. When a program has been loaded into the program store 30 under control of the loading program, and the first instruction character extracted from the program store, a control signal to bistable circuit 37 puts the apparatus under control of the loaded program rather than the permanent loading program.

A shown in FIG. 5, the typewriter keyboard 12 has a conventional array 210 of keys representing the letters of the alphabet, the numerals 0 to 9 and other symbols, as well as the usual space bar and tabulating keys, etc. Associated with each key is a microswitch (not shown) which is actuated by depression of the key, the microswitches being arranged in a matrix 200, which is scanned by a suitable coding circuit 201 under the control of logic circuit 266, so that depression of a key causes a coded character to be emitted. The coded character is supplied through selection logic circuit 260 and a code translating device 262, which converts the characters to the international standard code used by the apparatus, into a static eight-bit register 264. Register 264 is arranged so that it can be included temporarily in the recirculation loop of a 64-character keyboard buffer store 202, to enable a character supplied from the keyboard to be transferred to and stored in the buffer store, or to be extracted from the store, under the control of logic circuit 268, and transferred, in response to a decoded program instruction or an instruction from the permanent loading program, through the data highway to other buffer stores or registers, e.g., to the general address register 164, the working buffer store 250 (FIG. 2*b*), or to the printer buffer store 206.

The keyboard is in addition provided with a number of special keys. For of these keys, shown in FIG. 5 by reference numerals 212, 214, 216 and 218, are referred to as "keyboard entry termination keys" and enable the operator of the apparatus to cause the apparatus to revert to program control after the keyboard has been operated, selection of different ones of the four keys causing the program control to proceed in different ways. These keys are numbered "1" to "4", and operation of each key causes the corresponding number to be stored in binary form in a special two-bit register (not shown). The keys can be assigned particular functions by a program stored in the program store 30. For example, a program may contain a "conditional skip" instruction which, when decoded, will cause all the succeeding program instructions to be ignored, if the contents of the two-bit register indicate that a particular one of the four keys has been depressed, until a particular program instruction is reached. One of the four keys is operable initially to cause the permanent loading program to effect loading into the program buffer store of a program from a magnetic card inserted into the first magnetic card reader as described below.

To allow immediate corrections to be made of keying errors during operation of the keyboard, the electronic circuitry of the apparatus includes a working buffer store 250 (FIG. 2*b*) having a capacity of 128 characters, and an address pointer register the contents of which can be incremented or decremented, i.e., increased or decreased by one, in response to the depression of respective special keys 220 and 222 (FIG. 5) on the keyboard, which may be referred to as the "cursor space" and "cursor backspace" keys. When, for example, the apparatus is being used to record data in coded form onto a magnetic card inserted into the second read/write mechanism 18 under the control of a program stored in the program store 30, one of the decoded program instructions causes the working buffer store 250 to be placed in a condition to receive characters from the keyboard buffer store 202. The coded characters inserted into the keyboard buffer store 202 on manual operation of the keyboard are then transferred to the working buffer store 250, and the printer 14 may be simultaneously operated to print out the characters. If an error is made by depressing the wrong key, the cursor backspace key 22 can be depressed by the operator the requisite number of times to make the contents of the working buffer store pointer equal to the address in the store at which the wrong coded character is positioned. Depression of the correct key will then cause the correct coded character to be inserted into the working buffer store 250 in place of the incorrect character. The cursor space key 220 is then operated the requisite number of times to cause the address pointer contents to be increased to the address at which the insertion of characters was stopped, so that the input of data through the keyboard can be resumed. The coded signals emitted in response to the cursor space and cursor backspace keys are simultaneously inserted into the printer register 36 and are decoded to cause space and backspace movement of the typewriter carriage, the signal from the cursor space key 220 being also simultaneously decoded to cause printing out of the corresponding character in the printer buffer 202, so that the operation of error correcting appears to the operator as the operation of backspacing and typing the correct character over the incorrect character. When a complete record has been inserted into the working buffer store 250, the contents of the buffer store can be transferred to the track buffer store 130 or 132 associated with the appropriate read/write mechanism 16 or 18 and the characters extracted singly from the track buffer store to cause the read/write head to record the coded character in the selected block on the card, the address of the block having been previously keyed by the operator and the coded address transferred to the appropriate head position address register 160 or 162.

An on-off switch 229 is provided on the keyboard. Movement of the switch to its "on" position causes the apparatus, under the control of the permanent loading program, to go through an initialisation routine by moving the read/write head of each read/write mechanism to the position corresponding to block address "00", ejecting any cards in the read/write mechanisms, and placing itself in its idle state. If the switch 229 is moved to its "off" position whilst a card remains in either of the read/write mechanisms, the apparatus will automatically record the contents of the relevant track buffer store onto the appropriate track of the card and eject the card before switching itself off.

The typewriter printer 14 comprises a basket of type levers (not shown) each actuatable by a solenoid to cause a type head to strike the platen roll of the typewriter printer, the various mechanical operations of the printer, such as case shift, and carriage return and rotation of the platen roll when a new line is to be typed being also effected by means of solenoids. Control circuits of the printer cause actuation of the type levers and mechanical operations of the printer in response to signals received from the decoder 38 connected to the printer register 36.

Associated with the typewriter printer is a 64-character printer buffer store 206 which, for reasons of economy, is combined with the keyboard buffer store 202 into a single 128-character buffer store, though the two buffer stores operate effectively independently of one another. The buffer stores are provided with respective address pointers 207 and 208. The printer buffer is connected to the eight-bit register 264 in the same way as the keyboard buffer store 202, and can receive characters, under the control of logic circuit 268, through the data highway from other buffer stores and registers, e.g., from the keyboard buffer 202 or the track buffer stores 130 or 132. A character from the printer buffer store 206 can be held statically in the eight-bit register 264 and from there shifted serially into the printer register 36. The printer decoder 38 is adapted to decode characters in a "basket-related" code, as described below. To convert a coded character in the eight-bit register 264 to the basket-related code, the digits of the character are circulated in parallel through lines 265, selection logic circuit 260, and translator 262, and back into the register 264, the translator being conditioned to translate the character during this operation into the basket-related code. The basket-related code into which each character is translated includes a group of six bits whose numerical value corresponds to the serial position in the type basket of the type bar which is to be actuated to cause printing out of the decoded character. Thus the upper and lower case characters which are printed out by actuation of the type bar at one side of the type basket are each represented by a coded character including the six bit group 000000, the characters printed by actuation of the adjacent type bar are each represented by a coded character including the six bit group 000001, and so on. The remaining two bits of each eight-bit coded character are a "shift" bit, representing the upper case and lower case positions of the typewriter, and the parity bit.

A calculating device 245 is connected to the eight-bit register 264 and the printer register 36 so that, in operation, as a coded character is transferred from the eight-bit register 264 to the printer register 36 the group of six bits of the character is also supplied serially through line 247 to the calculating device 245. At the same time, the preceding character in the printer register 36, which has just been decoded, is serially shifted out of the register and the group of six bits of this character is also transferred serially through line 249 to the calculating device 245. The calculating device 245 includes a subtractor which calculates the modulus of the difference between the two six bit groups, and a register which stores the result of this calculation. It will be apparent that the value of this result gives the separation between the type bar actuated in response to the decoding of the character which has been shifted out of the printer register and the type bar which is to be actuated in response to decoding of the character now transferred to the printer register.

If the separation between the type bars thus calculated is greater than 3, then the control circuits cause actuation of the type bar by the decoding device 38 to be begun immediately a signal is received from a feedback contactor 241, operable by the type bars of the printer, indicating that the preceding type bar has reached its uppermost position. If, on the other hand, the calculated separation between the type bars is less than or equal to 3, a predetermined delay is introduced between receipt of the signal from the preceding type bar and the actuation of the next type bar, the delay being equal to the time taken for a type bar to move from its uppermost position back to its rest position. Thus, successively actuated type bars which are more than three positions apart in the type basket are successively actuated at a greater rate than type bars which are three or less than three positions apart in the type basket.

The typewriter printer 14 is provided with a right hand margin stop 242 which can be set by the operator. When the typewriter carriage reaches the stop 242, an electrical signal is supplied to control circuits 244. If the printer is printing out data read from a magnetic card, under the control of a program in the program store 30, the electrical signal will cause the printer register decoder to be placed in a state in which the first "space" code transferred from the printer buffer store 206 to the printer register 36 to be decoded as if it were the instruction "new line," which causes return of the printer carriage so that printing out of the next word begins on a new line. The electrical signal from the margin stop 242 also causes a special counter 246 to be incremented as each character is printed, so that the counter in effect counts the number of characters printed beyond the margin stop. If the number of characters thus printed reaches 10, without the appearance of a "space" code which will cause a new line to be begun, the printer is automatically stopped to await operator intervention. The keyboard is provided with two special keys 224 and 226 (FIG. 5), depression of one of which (224) causes the next character to be printed out, whilst the other (226) causes a "hyphen" code to be inserted through line 248 into the eight-bit register 264 from where it is transferred to the printer register 36 and is decoded to cause printing out of the hyphen. A "new line" code is thereupon transferred, through line 248 and the printer/keyboard register, to the printer register 36 to cause a new line of printing to be begun, whereupon the loaded program resumes control and printing is continued. Thus the operator can choose either to hyphenate at a suitable point the word being printed or to continue printing the word one character at a time until the word is completed and a space code is transferred to the printer register, whereupon a new line is automatically begun and the loaded program resumes control. Thus the printer will automatically justify the printing out of data, operator intervention being required only when a long word is begun shortly before the right hand margin. A special key 228 on the keyboard can be actuated to cause the printer to halt when a new line instruction has been executed, so that the printer will print out the text line by line, the operator initiating printing of each line by re-setting key 228.

Fixed to the typewriter 10 is a bank of indicating lamps 11 (FIG. 1), which are shown diagrammatically in FIG. 5. Lamp 230 is illuminated by a signal from the instruction register decoder 34 (FIG. 2*c*) when the general address register is ready, as described above to receive an address from the keyboard. Lamp 232 is similarly illuminated by a signal from the instruction register decoder when the apparatus is operating under program control, to indicate that a point in the program has been reached at which alpha-numeric entries can be made from from keyboard.

FIG. 2*e* shows a 128-character data communications buffer store 350, having an address pointer register 352 and associated comparator 354, which, under the control of logic circuit 356, can receive coded characters from the data highway through logic gate 358 and supply characters to the data highway through access logic circuit 360. Coded characters can also be supplied, under the control of circuitry 362 through line 364, to a modulator/demodulator (not shown) by means of which the characters can be transmitted through a telephone line to another similar apparatus or to, e.g., a central computer. Coded characters can also be supplied from the modulator/demodulator through line 366 to the buffer store 350. Lamp 234 is illuminated by a signal from the bistable circuit 37 to indicate that the apparatus is in its idle state and can be used manually as an ordinary electric typewriter.

Lamps 236 and 238 are to indicate errors detected by the apparatus. Lamp 236 is illuminated, e.g., when keyboard entries are made when the working buffer store is full, or if a non-numeric key is depressed when the address register is conditioned to receive numeric entries from the keyboard, or if a parity check indicates that a magnetic card has been misread. Each of these errors will cause the apparatus to halt operation until a re-set key 227 on the keyboard is depressed. Depression of key 227 causes, e.g., the misread track of a card to be read again. Lamp 236 is also illuminated when an error occurs such as a buffer being overloaded by a series of coded characters transferred from another buffer, or a parity error detected in a character in a buffer, these errors causing the apparatus to revert to the initialisation sequence of operations described above. Lamp 238 is provided to give an indication of an error condition when the apparatus is being used to transmit or receive data over a telephone line, the lamp being illuminated when the apparatus is unable for any reason to transmit or receive data.

In operation of the automatic typewriter to print out programmed selections of data recorded on a magnetic card 22 in accordance with a program recorded on a further magnetic card, the magnetic card on which the program is recorded is inserted into the first read/write mechanism 16, and the magnetic card containing recorded data is inserted in the second read/write mechanism 18. The special key 212 on the keyboard is pressed by the operator to cause the permanent loading program to assume control. Indicating lamp 230 is illuminated, and the operator then depresses the appropriate two numeric keys of the keyboard representing the address of the magnetic card track on which the desired program is recorded, and the coded characters representing the addresses are inserted into the keyboard buffer 202, and transferred from there to the general address register 164 and thence to the address register 160 associated with the first read/write mechanism. Key 214 is depressed, and the read/write mechanism 16 operates under the control of the permanent loading program to reproduce the coded characters in the addressed track of the magnetic card, the series of coded characters being inserted into the associated track buffer store 130 and then transferred from there, if the parity check on each coded character is correct, to the program store 30. The first coded character is extracted from the program store 30 and transferred via the transfer register 102 to the instruction register 32. When the first coded character of the program read from the magnetic card is inserted into the instruction register 32 and decoded, control passes from the loading program to the loaded program.

If the loaded program, for example, is to effect printing out of the data stored in one block of the magnetic card in the second read/write mechanism 18, the first decoded instruction would cause the address of the required block to be transferred to the address register 162 associated with the second read/write mechanism, so that the mechanism 18 is actuated to reproduce the coded data recorded in the track of the magnetic card containing the addressed block, the data being inserted into the associated track buffer store 132. The program instructions, each extracted in turn from the program store 30 and decoded when the execution of the last preceding instruction has been completed, will then cause the required block of data to be transferred to the printer buffer store 206. From the printer buffer store, one coded character at a time is transferred to the printer register 36 and decoded to cause operation by the typewriter printer to print out the character or to perform the mechanical operation represented by the character. When the last character of the block of data has been transferred to the printer buffer 206, the next succeeding program instruction character is transferred from the program store 30 and decoded. This instruction might, for example, cause the apparatus to return to its idle state to await intervention from the operator, or might cause a further block of data to be read from the magnetic card in the second read/write mechanism 18 and printed out under the control of the same program, or might cause a further program to be read from the magnetic card in the first read/write mechanism 16, the further program being inserted in the program store 30 in place of the first program, so that, in effect, composite programs occupying more than one track of a magnetic card can be used. The program might, at selected points in the program, cause the apparatus to be put in its idle state, in which the typewriter acts as if it were a conventional electric typewriter, to allow the operator to manually type in additional data, this data being printed out directly. The control can then be returned to the program by depression of one of the special keys on the keyboard.

It will be apparent that each program can be in the form of a loop, so that, for example, the same program can be used to print out data from a series of blocks on a magnetic card, an instruction at a suitable point in the program causing the address in the appropriate address register to be incremented once during each program cycle. Several different units of data could be recorded in one block of a magnetic card, the units being separated by field separators. It will be appreciated that by reading a single track containing two blocks of data, each of which may contain more than one unit of data, and transferring the data thus read to the associated track buffer enables access to the particular block or unit of data required to be obtained very quickly It will be appreciated that the apparatus can be used to record in selected tracks of a magnetic card the data which is then available to be printed out as described above. The recording may be under the control of a program loaded from a magnetic card as described. Since the programs are recorded on a magnetic card as a series of characters in digital coded form in the same manner as data, the program can be recorded on a card in the same way as data, the characters represented by the various keys of the typewriter keyboard being allotted to particular program instructions.

It will be appreciated that the described apparatus allows of great flexibility of use. Thus a single magnetic card may contain a large amount of information, different selections of which need to be printed out in various arrangements, (e.g., in printing orders, invoices, packing notes, etc., relating to the same transaction). This can be done with the described apparatus under the control of programs recorded on a separate magnetic card. The use of magnetic cards enables a required program to be selected and loaded very quickly into the program store, and similarly enables data recorded on a card to be retrieved quickly from any addressed location on the card. The apparatus enables data to be readily recorded on magnetic cards, and also enables the data recorded to be easily updated when required, fresh data being simply overwritten over the superseded data on the card. Moreover, the apparatus can as readily be used to record the requisite programs onto magnetic cards.

The apparatus can also be used, e.g., in letter or report writing, the operator typing out a draft at high speed, ignoring odd keying errors and line length, the typed data being recorded under the control of a suitable program on a magnetic card, where it is available for later correction as described above. After correction, the data can be automatically printed out as described above.

The apparatus described could be used as described above to transmit data stored on magnetic cards through telephone lines to another similar apparatus each apparatus being connected to the telephone line through a suitable modulator/demodulator. The further apparatus can print out the received data or can record it relatively quickly onto a magnetic card so that the card acts as a temporary store of data which can be printed out at any suitable time. The apparatus can also be used as an intelligent terminal to send messages to and receive messages from a central computer. Programs loaded into the apparatus from a magnetic card can be used to rearrange data transmitted to or received from the computer, so that messages received and transmitted by the computer in a standard format can be translated by the apparatus into messages in a particular format required by the user. A number of apparatuses can be used to communicate with a central computer or with another similar apparatus, a suitable communications adaptor being provided to control the communication. A series of characters representing a program can similarly be transmitted by the apparatus. Thus a program might be transmitted to a similar apparatus, a suitable coded character being first transmitted to cause the receiving apparatus to transfer the characters to its program store.

It will be apparent that when the apparatus is to be used to transmit data or programs to a similar apparatus or to a computer, the printer and its associated circuitry can be dispensed with, the printer buffer being replaced by a buffer from which the coded characters can be supplied to the modulator/demodulator.

It will be appreciated that many modifications could be made in the described embodiment. For example, instead of a typewriter printer, other forms of printer could be used, or a visual display device, such as a cathode ray tube, could be used to display the data read from a magnetic card. Instead of using pairs of commercially available 128-character shift registers to form composite 256-character buffers, single 256-character shift registers could be used. Instead of using two magnetic card read/write mechanisms, a single mechanism could be used, a magnetic card being ejected from the mechanism after a desired program has been read from it and loaded into the program buffer store, so that the mechanism can then receive the card from which data is to read or on which data is to be recorded.

Instead of recording the coded characters representing data or programs in blocks each occupying one half of a track on a magnetic card, the coded characters could be recorded in blocks of variable length separated by field separators, each block beginning immediately after the end of the preceding block and extending, if necessary, onto the succeeding track of the card. In that case, one of the tracks could be used as an "address track" to record the number of the track on which each block commenced. Thus, in operation, after the address of the required block had been transferred to a suitable register, the address track would be read to find the track number corresponding to the block address, whereupon the appropriate track or tracks would be read to transfer the relevant blocks of data to the track buffer.

A single magnetic card could contain both programs and data, the program characters being recorded in separate blocks so that a desired program could be read from the card into the program store and data subsequently read from the same card in accordance with the program in the program store.

The apparatus could be provided with an arithmetic computing unit, connected to the data highway so as to be able to receive, e.g., from one of the track buffer stores, coded characters representing numbers and carry out arithmetic operations on the numbers before they are transferred, under the control of a program in the program store, to other parts of the apparatus. The computing unit might be used, for example, in preparing invoices to calculate the net price of a number of articles from the number required, which might be entered through the keyboard, and the unit price of the article, which might be read from a magnetic card in one of the card readers.

It will be appreciated that in the described embodiment the facilities for recording data and program onto magnetic cards could be omitted, so that the apparatus would operate with pre-recorded cards, the cards having been previously recorded on other equipment which may be at different location. Similarly, the facilities for reproducing data from a magnetic card could be dispensed with, the apparatus being then used to record data or programs onto magnetic cards under the control of a program read from the same or a further magnetic card, into the program store, separate apparatus being employed to reproduce when required the data thus stored on the magnetic cards.

We claim:

1. Apparatus for reproducing programmed selections of blocks of data recorded in coded form in a plurality of separate tracks each occupying one of a plurality of predetermined positions on a magnetic card, the selection of blocks of data being made in accordance with a program of instructions recorded as a series of characters in coded form in a separate block or blocks of characters on the same or another magnetic card, comprising:

program reproducing means including a magnetic card reader for reproducing from the appropriate magnetic card a series of characters representing a program and including a character or group of characters representing the predetermined position on the appropriate magnetic card of the track or tracks containing a selected block of data to be reproduced;

a program storing means connected to the program reproducing means for receiving and storing the series of characters reproduced by the magnetic card reader;

decoding means connected to the program storing means for receiving in sequence the instruction characters stored in the storing means and for decoding each instruction character received from the storing means; and data reproducing means including a magnetic card reader connected to the decoding means and an address register which can receive the coded character or group of coded characters representing the position of the selected block of characters recorded on the appropriate magnetic card, and control means operable in response to a decoded instruction from the program storing means to cause the magnetic card reader to reproduce data recorded in the track of the appropriate magnetic card containing the block of data whose position is specified by the character or group of characters held in the address register.

2. Apparatus as claimed in claim 1, in which the program reproducing means is operable in response to the decoding of an instruction character taken from a series of instruction characters in the program store to reproduce a further series of instruction characters recorded in coded form in a selected block or blocks on the appropriate magnetic card.

3. Apparatus as claimed in claim 1, in which separate magnetic card readers are provided for the program reproducing means and data reproducing means.

4. Apparatus as claimed in claim 1, in which means are provided for incrementing or decrementing the value of a group of characters held in the address register in response to a decoded instruction from the program store.

5. Apparatus as claimed in claim 1, in which the data reproducing means includes output means through which the coded data reproduced by the magnetic card reader can be supplied to transmitting apparatus for transmission to other equipment at a different location.

6. Apparatus as claimed in claim 1, in which the data reproducing means includes decoding means for decoding the reproduced data, and printing or display means operable in response to the decoding means to print out or display the decoded data.

7. Apparatus as claimed in claim 1, in which the or each magnetic card reader comprises a transducer head, driving means for effecting relative movement at constant speed between the head and a magnetic card in the direction of the parallel record tracks of the card, and head positioning means for moving the head transversely across the card to take up a position corresponding to any one of the record tracks.

8. Apparatus as claimed in claim 1, in which the program reproducing means is operable, in response to a manual input to the apparatus including an input representing the predetermined position on the appropriate magnetic card of a track containing a selected block of instruction characters, to reproduce the instruction characters recorded in the track.

9. Apparatus for reproducing programmed selections of blocks of data recorded in coded form in a plurality of separate tracks each occupying one of a plurality of predetermined positions on a magnetic card, the selection of blocks of data being made in accordance with a program of instructions recorded as a series of characters in coded form in a separate block or blocks of characters on the same or another magnetic card, comprising:

program reproducing means including a magnetic card reader for reproducing from the appropriate magnetic card a series of characters representing a program and including a character or group of characters representing the predetermined position on the appropriate magnetic card of the track or tracks containing a selected block of data to be reproduced;

a program storing means connected to the program reproducing means for receiving and storing the series of characters reproduced by the magnetic card reader;

decoding means connected to the program storing means for receiving in sequence the instruction characters stored in the storing means and for decoding each instruction character received from the storing means; and data reproducing means including a magnetic card reader connected to the decoding means and operable under control of the decoded instructions for reproducing from the appropriate magnetic card data recorded in the track or tracks containing selected blocks of data;

said program means including an address register which can receive a coded character or group of coded characters representing the predetermined position on the appropriate magnetic card of a selected block of characters recorded on the magnetic card, and control means operable in response to a manual input or to a decoded instruction from the program store to cause the associated magnetic card reader to reproduce data recorded in the track of the appropriate magnetic card containing the program whose position is specified by the character or group of characters held in the address register.

10. Apparatus as claimed in claim 9, in which means are provided for incrementing or decrementing the value of a group of characters held in the address register in response to a decoded instruction from the program store.

11. Apparatus for reproducing programmed selections of blocks of data recorded in coded form in a plurality of separate tracks each occupying one of a plurality of predetermined positions on a magnetic card, the selection of blocks of data being made in accordance with a program of instructions recorded as a series of characters in coded form in a separate block or blocks of characters on the same or another magnetic card, comprising:

program reproducing means including a magnetic card reader for reproducing from the appropriate magnetic card a series of characters representing a program and including a character or group of characters representing the predetermined position on the appropriate magnetic card of the track or tracks containing a selected block of data to be reproduced;

a program storing means connected to the program reproducing means for receiving and storing the series of characters reproduced by the magnetic card reader;

decoding means connected to the program storing means for receiving in sequence the instruction characters stored in the storing means and for decoding each instruction character received from the storing means;

data reproducing means including a magnetic card reader connected to the decoding means and operable under control of the decoded instructions for reproducing from the appropriate magnetic card data recorded in the track or tracks containing the selected blocks of data;

input means through which data in the form of a series of characters can be supplied to the apparatus;

recording means combined with the or each magnetic card reader in a magnetic card read/write mechanism and operable in response to decoded instructions taken from a program in the program storing means to record the characters in coded form in pre-selected positions on a magnetic card; and respective buffer stores for the or each magnetic ard read/write mechanism and for the input means, each buffer store being adapted to store temporarily a coded character or series of coded characters supplied by the associated read/write mechanism or input means or to be supplied to the associated read/write mechanism.

12. Apparatus as claimed in claim 11, in which the input means comprises a manually operated keyboard having a plurality of key and electrical circuit means associated with each key adapted, in response to depression of each key, to provide an electrical signal to encoding means operable to supply a coded character in response to the electrical signal.

13. Apparatus as claimed in claim 12, in which the data reproducing means includes printing means for printing out reproduced data, and the printing means and manually operated keyboard are arranged together as an electric typewriter.

14. Apparatus as claimed in claim 11, which is adapted for use with magnetic cards in which data is recorded in coded form in a plurality of parallel tracks each accommodating more than one block of data, and in which the or each magnetic card reader is operable to reproduce one track of characters in a single operation, the reproduced characters being stored in the associated buffer store, and means are provided for extracting from the buffer store a selected one of the blocks of characters held in the store.

15. Apparatus as claimed in claim 11, in which the buffer stores and the program store each comprise a number of continuously recirculating shift registers, the synchronous operation of which is controlled by a clock generating pulses at a constant frequency, the position of each character space in the shift register being defined by the time at which that character space appears at the output of the shift register, and there is associated with each shift register an address pointer which can be set to specify the position of a selected character space in the shift register, and a comparator operable to compare the time specified by the address pointer and the clock time.

16. Apparatus for recording data in coded form in a track or tracks occupying a selected one or selected ones of a plurality or predetermined positions on a magnetic ard, in accordance with a program of instructions recorded as a series of characters in coded form on the same or another magnetic card, comprising:

program reproducing means including a magnetic card reader for reproducing from the appropriate magnetic card a series of characters representing a program;

a program storing means connected to the program reproducing means for receiving and storing the series of characters reproduced by the magnetic card reader;

decoding means connected to the program storing means for receiving in sequence the instruction characters stored in the storing means and for decoding each instruction character received from the storing means;

data input means for supplying to the apparatus a series of data characters; and recording means including a magnetic card writer connected to the decoding means and an address register which can receive from the program storing means a coded character or group of coded characters representing the predetermined position of the track or tracks in which data is to be recorded on the appropriate magnetic card, and control means operable in response to a decoded instruction from the program storing means too cause the magnetic card writer to record the characters supplied by the input means in the track or tracks of the magnetic card whose position is specified by the character or group of characters held in the address register.

* * * * *